United States Patent
Bender

[11] Patent Number: 5,978,413
[45] Date of Patent: *Nov. 2, 1999

[54] METHOD AND SYSTEM FOR PROCESSING A PLURALITY OF MULTIPLE ACCESS TRANSMISSIONS

[76] Inventor: Paul E. Bender, 2879 Angell Ave., San Diego, Calif. 92122

[ * ] Notice: This patent issued on a continued prosecution application filed under 37 CFR 1.53(d), and is subject to the twenty year patent term provisions of 35 U.S.C. 154(a)(2).

[21] Appl. No.: 08/518,217

[22] Filed: Aug. 28, 1995

[51] Int. Cl.⁶ ..................................... H04B 7/216
[52] U.S. Cl. .................. 375/206; 375/260; 375/349; 370/342; 370/491; 455/506
[58] Field of Search ..................... 375/200, 205, 375/206, 349; 370/203, 208, 209, 335, 342, 441, 479, 491; 455/506

[56] References Cited

U.S. PATENT DOCUMENTS

| | | | |
|---|---|---|---|
| 4,134,071 | 1/1979 | Ohnsorge | 375/200 |
| 4,470,138 | 9/1984 | Gutleber | 370/342 |
| 5,099,493 | 3/1992 | Zeger et al. | 370/342 |
| 5,105,435 | 4/1992 | Stilwell | 375/200 |
| 5,109,390 | 4/1992 | Gilhousen et al. | 370/335 |
| 5,136,612 | 8/1992 | Bi | 375/200 |
| 5,151,919 | 9/1992 | Dent | 370/209 |
| 5,218,619 | 6/1993 | Dent | 370/209 |
| 5,341,395 | 8/1994 | Bi | 370/342 |
| 5,363,403 | 11/1994 | Schilling et al. | 370/441 |
| 5,467,368 | 11/1995 | Takeuchi et al. | 375/206 |
| 5,528,624 | 6/1996 | Kaku et al. | 375/206 |
| 5,553,062 | 9/1996 | Schilling et al. | 370/479 |
| 5,579,304 | 11/1996 | Sugimoto et al. | 375/349 |
| 5,787,112 | 7/1998 | Murai | 375/206 |
| 5,787,130 | 7/1998 | Kotzin et al. | 375/346 |

FOREIGN PATENT DOCUMENTS

| | | | |
|---|---|---|---|
| 0526439 | 2/1993 | European Pat. Off. | H04J 13/00 |
| 0641102 | 3/1995 | European Pat. Off. | H04K 1/02 |

*Primary Examiner*—Amanda T. Le
*Attorney, Agent, or Firm*—Russell B. Miller; Brian S. Edmonston; Christopher O. Edwards

[57] ABSTRACT

A method and system incorporating the use of interference cancellation during synchronized demodulation of a code division multiple access (CDMA) signal is described. A wireless communications receiver uses synchronized demodulation techniques to estimate the data contained in multiple orthogonal sub-channels of multiple CDMA signals. In response to these estimates an ideal waveform is constructed for each CDMA signal. These ideal waveforms are subtracted from the original signal received to form an interference-cancelled version of the original signal which is used when demodulating individual orthogonal sub-channels.

13 Claims, 3 Drawing Sheets

METHOD AND SYSTEM FOR PROCESSING A PLURALITY OF MULTIPLE ACCESS TRANSMISSIONS

BACKGROUND OF THE INVENTION

I. Field of the Invention

The present invention relates to wireless communications. More particularly, the present invention relates to a method and system incorporating the use of interference cancellation during the forward link portion of a wireless telecommunication system communication.

II. Description of the Related Art

FIG. 1 is a illustration of the radio frequency (RF) electromagnetic signal transmissions associated with the forward link portion of a code division multiple access (CDMA) wireless telecommunications system. Base transceiver stations 100(*a*) and (*b*) transmit multiple access spread spectrum forward link signals 102(*a*) and (*b*) that are upconverted to an RF bandwidth. Via the process of reflection, building 106 generates forward link signal 102(*c*) in response to forward link signal 102(*a*). Subscriber unit 104(*a*) is positioned such that it receives forward link signals 100(*a*), (*b*) and (*c*), while subscriber unit 104(*b*) is positioned such that it receives only forward link signals 102(*a*) and (*b*). In an alternative configuration, one or more of base transceiver stations 100 generate multiple forward link signals 102 that are transmitted to portions of the surrounding area, usually referred to as "sectors", via directional antenna systems.

Each forward link signal 102 is comprised of a set of channels each of which carries one kind of information necessary to conduct the forward link portion of any communication (normally a telephone call) with subscriber units 104(*a*) and (*b*). The various kinds of information include pilot data for detecting the presence of a forward link signals 102, synchronization data for synchronizing with forward link signal 102, paging data for notifying a subscriber unit 104 of an incoming communication, and various sets of traffic data which generally consist of digital audio information, digital data, or both. The digital audio information is usually an electronic representation of the physical sound waves associated with actual audio information, preferably generated via the process adjusting the voltage level of a node within a telephone or other electronic system based on samples of the sound waves. The electronic information is digitized by performing periodic sampling of that voltage, and by generating binary numbers corresponding to the voltage potential detected at each sample. Various techniques for encoding and compressing these binary numbers well known in the art may also be employed. Upon receiving each forward link signal 102, subscriber units 104(*a*) and (*b*) separate the channels they need for their particular communication from the remaining channels via various type of signal processing. The remaining channels contain the information used to conduct other communications with other subscriber units 104 in the same area (not shown) which are also carried by each forward link signal 102.

The generation of the set of channels necessary for transmitting the multiple kinds of information via a single forward link signal 102 is performed via the use of a set of channel codes each of which is orthogonal to the remaining set. Before transmission, each bit of data associated with each kind of information is direct sequence modulated in a synchronized fashion with one of the channel codes from the set of channel codes. In one implementation of such a system, sixty-four channel codes are used, each channel code containing sixty-four chips with each chip having a value or either 1 or −1, with a −1 being used to represent a logic 1 and a 1 representing a logic 0. Once modulated, the various types of data are spread via direct sequence modulation with a common spreading code which is also comprised of a series of 1 and −1 values. The spreading code is generally much longer than the channel codes and only a portion of it is applied to any particular bit of data. The spread data is then summed together and upconverted for transmission via forward link signals 102. As shown in FIG. 1, multiple instances of these forward link signals are generated either by separate base transceiver stations 100, or via the process of reflection. Each of the forward link signals can then be received by subscriber units 104(*a*) and (*b*).

Upon receiving a set of multiple forward link signals 102, subscriber units 104(*a*) and (*b*) despread and demodulate a sub-set of these forward link signals in order to separate out the data necessary to conduct a communication. The sub-set is selected on the basis of signal quality and which forward link signals 102 promote diversity of signal source. If fewer than a certain number of forward link signals 102 are received, all of the forward link signals 102 can be demodulated. The demodulation is performed with a particular channel code from the set of orthogonal channel codes that has been assigned to the desired data. The demodulation of the forward link signal 102 with a particular channel code removes other orthogonal energy from that forward link signal 102, thereby isolating the desired data associated with that channel code from the remaining data so long as the set of channels within each forward link signal remain synchronized.

FIG. 2 is a block diagram of the RF signal reception and processing portion of a subscriber unit 104 (FIG. 1) when configured in accordance with the prior art. During operation, any RF signals received by antenna system 202 having frequencies that fall within a predetermined bandwidth are downconverted by RF signal processing system 203 and supplied to AGC system 200. AGC system 200 measures the energy level of the downconverted signals and amplifies or attenuates them as necessary to place the energy level of those signals within a predetermined decibel range. The gain adjusted signals are then applied to analog signal processing system 201 which further downconverts and digitizes the signals, and applies the digitized signals to searcher 206. Searcher 206 receives the digitized signals and identifies any forward link signals 102 transmitted from base transceiver station 100 by searching at various time offsets for the associated pilot channel.

When a forward link signal 102 is detected, searcher 206 calculates an arrival time for that forward link signal 102, which in the preferred embodiment takes the form of a time offset from a synchronization signal, and provides that information to control system 205. Control system 205 then assigns one of despreaders 208(*a*)–(*c*) to despread the forward link signal 102 using the time offset. Despreading is generally performed via direct sequence demodulation, which in one implementation constitutes performing a chip-by-chip multiplication operation on the data using the same spreading code used to spread the data originally. As additional forward link signals 102 are detected, control system 205 identifies those of the highest quality and assigns despreaders 208(*a*)–(*c*) to despread those signals.

The resulting despread signals from despreaders 208(*a*)–(*c*) are passed to traffic channel demodulators 210(*a*)–(*c*) which demodulate the signals using a channel code associated with the desired traffic data, with the appropriate channel code being unique for each subscriber unit 104 engaged in a communication with a particular base transceiver station 100. In one implementation of such a system, the demodulation with the channel code comprises performing a chip-by-chip multiplication operation with the data using the entire channel code and then summing the results of the multiplications to obtain an estimate of the data being transmitted. The estimates from traffic channel demodulators 210(a)–(c) can then be received from nodes 212(a)–(c) by other signal processing systems within a subscriber unit 100 (not shown), which will generally combine the estimates using various well known techniques in order to generate a single estimate of the data used for further processing.

During the processing of a particular forward link signal 102, the channels within that forward link signal 102 remain synchronized because they are transmitted via a single RF signal, and therefore travel the same path to arrive at a particular destination such as subscriber unit 104. This is not the case for channels carried by different forward link signals 102, however, because different forward link signals 102 generally travel different paths and therefore different distances to arrive at a particular destination. These different distances causes each forward link signal 102 to arrive with a slight time offset with respect to other forward link signals 102 which removes any orthogonality between the channels carried by one forward link signal 102 with respect to channels carried by another forward link signal 102. This lack of orthogonality prevents the energy associated with the channels of a first forward link signal 102 from being removed completely from a second forward link signal 102 via demodulation with a channel code. While the presence of this unremoved energy degrades the quality of any data produced using the second forward link signal 102, the degradation is generally not to a degree sufficient to prevent proper operation of the wireless telephone system. Nonetheless, if a method for processing a forward link signal could be developed that allowed at least some of the non-orthogonal energy from the other forward link signals 102 to be removed, such a development would substantially improve the quality of the data produced by a subscriber unit 104 incorporating the use of that method. This improved quality would also result in a reduction in the amount of power necessary to complete the transmission of data, which in the context of a CDMA wireless telecommunications system allows for increased data carrying capacity. Therefore, such a development would be highly desirable.

SUMMARY OF THE INVENTION

Based of the forgoing, a method and system for incorporating the use of interference cancellation during the forward link portion of a wireless telecommunication system is described. A wireless subscriber unit receives multiple forward link signals and estimates the data being transmitted via each forward link signal. In response to these estimates an associated ideal waveform is generated for each forward link signal received. For each forward link signal processed, the ideal waveform of the other forward link signals are subtracted from the signal level of that forward link signal being processed before the associated data is determined. In the preferred embodiment, the forward link signals are processed in accordance with code division multiple access spread spectrum techniques, and the estimation of the data being transmitted is performed via the use of a fast Hadamard transform. In an alternative embodiment, the estimation of data is performed on a single channel, or sub-set of channels, carried by the forward link signals, with at least the signal level associated with a pilot channel being estimated.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT

A method and system for incorporating the use of interference cancellation during the forward link portion of a wireless telecommunication system is described. In the following description, various signal processing systems and the arrangements thereof are described in detail. It will be apparent to one skilled in the art that a variety of well known methods and apparatus for implementing such signal processing systems may be used including the use of digital signal processors and digital microprocessors controlled by software, or custom designed integrated circuits, with the latter being used in the preferred embodiment.

It will also be apparent to one skilled in the art that where multiple instances of a particular system are shown, a single instance of that system may generally be substituted, with the use of that system being time shared between the various functions performed by the multiple systems. In other instances throughout the application, various well known systems are described in block form. This is done in order to avoid unnecessarily obscuring the disclosure of the present invention. In general, the signal levels and data referred to throughout the application constitute electronic, voltage dependent, representations of various type of digital information including audio information generated via sampling, or voltages generated for the purpose of controlling other electronic systems. Although the invention is described in the context of a land based wireless cellular telephone system, other wireless communication systems will benefit from the use of the present invention including satellite based wireless telecommunication systems.

Figure 3:
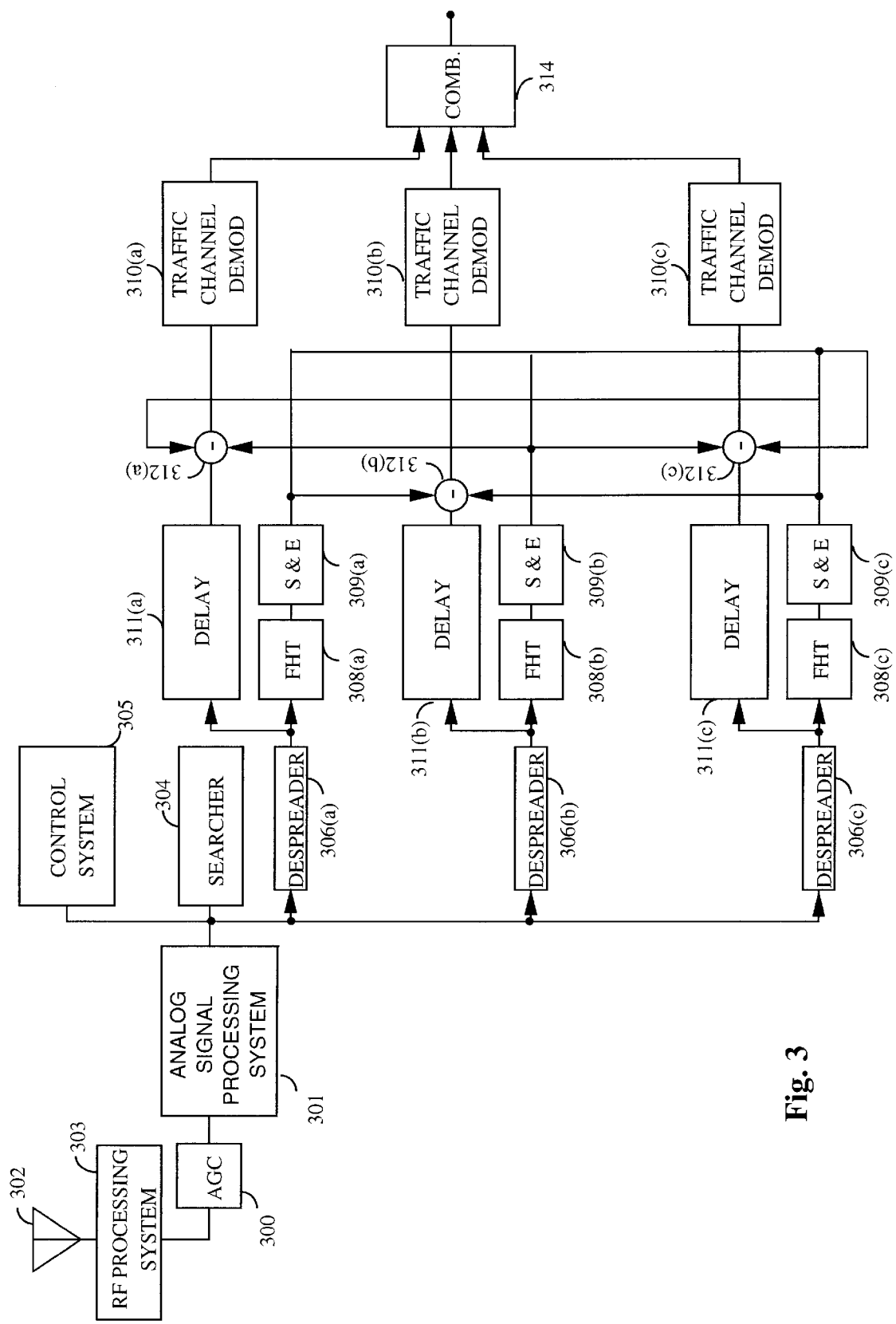
FIG. 3 is a block diagram of the RF signal reception and processing portion of a subscriber unit when configured in accordance with the one embodiment of the invention.

FIG. 3 is a block diagram of the radio frequency (RF) signal reception and processing portion of a subscriber unit when configured in accordance with the one embodiment of the invention. RF signal processing system 303 is coupled to antenna system 302 and automatic gain control (AGC) system 300. Analog signal processing system 301 is coupled to AGC system 300 as well as to despreaders 306(a)–(c), and searcher 304. Control system 305 is coupled to searcher 304. The output of despreaders 306(a)–(c) are applied to fast Hadamard transform (FHT) systems 308(a)–(c) and delay circuits 311(a)–(c). The output of delay circuits 311(a)–(c) pass through subtraction systems 312(a)–(c) and traffic channel demodulators 311(a)–(c) respectively, before being applied to combiner 314. The outputs of FHT systems 308(a)–(b) are applied to summation and estimation (S & E) systems 309(a)–(c). Subtraction system 312(a) receives the outputs of S & E systems 308(b)–(c), subtraction system 312(b) receives the outputs S & E systems 308(a) and (c), and subtraction system 312(c) receives the outputs of S & E systems 308(a) and (b).

Besides the connections shown, additional connections between control system 305, traffic channel demodulators 310, and FHT systems 308 also exist, with the preferred method of connection being the use of a control bus to which each system is coupled. These connections are not shown for ease of drawing, but they are used to exchange control information between the various systems. Additionally, while only three instances of despreaders 306, FHT systems 308, S & E systems 309, traffic and subtraction systems 312 are shown, other embodiments of the invention may include the use of a fewer or greater number of these signal processing systems. As mentioned above, some the use of some systems may be time shared. It should also be noted that the number of these sets of circuits does not need to match the number of traffic channel demodulators 310. In general, any additional S & E systems 309 should have their outputs applied to every subtraction system 312 associated with a different traffic channel demodulator 310. Other embodiments of the invention may apply fewer outputs to each subtraction system 312, however, such a configuration would most likely be the result of hardware constraints, not performance considerations, and therefore not preferred.

During operation, RF signals received by antenna system 302 having frequencies that fall within a predetermined bandwidth are downconverted by RF signal processing system 303 and applied to AGC system 300. AGC system 300 places the signals in a predetermined decibel range and applies the adjusted signals to analog signal processing system 301. Analog signal processing system 301 further downconverts the signals to baseband and digitizes the baseband signals using eight bit samples, and applied the digitized signals to searcher 304 and despreaders 306(a)–(c). Searcher 304 detects any forward link signals 102 (FIG. 1) received within the digitized signals by performing correlations using a pilot channel code and a predetermined set of pilot data at various time offsets until an increased energy level is detected. Additionally, searcher 304 identifies the base transceiver station from which the forward link signal is generated. Additionally, searcher 304 measures the signal strength of each forward link signal 102. This information is provided to control system 305.

Control system 305 configures each one of despreaders 306(a)–(c) to properly despread the forward link signals 102 identified by supplying each despreader with the time offset information associated with one of the forward link signals 102 detected by searcher 304. In the preferred embodiment despreading is performed by multiplying the digitized signal with the spreading code used to spread the data originally. Control system 305 also provides the associated traffic channel demodulators 310 with the appropriate traffic channel code, which will depend on the base transceiver station from which the forward link signal is generated. In the preferred embodiment of the invention, each channel code is comprised of sixty-four chips that have either a 1 or –1 value representing a logic 0 and 1 respectively, and each bit of data is modulated using the entire channel code. Also, sixty four channel codes are utilized in the preferred embodiment, each of which is orthogonal to the remaining set. Such a set of codes is often referred to as a Hadamard matrix, with each row within the Hadamard matrix constituting a channel code, and with the channel codes being referred to as "Walsh" codes or sequences.

Figure 1:
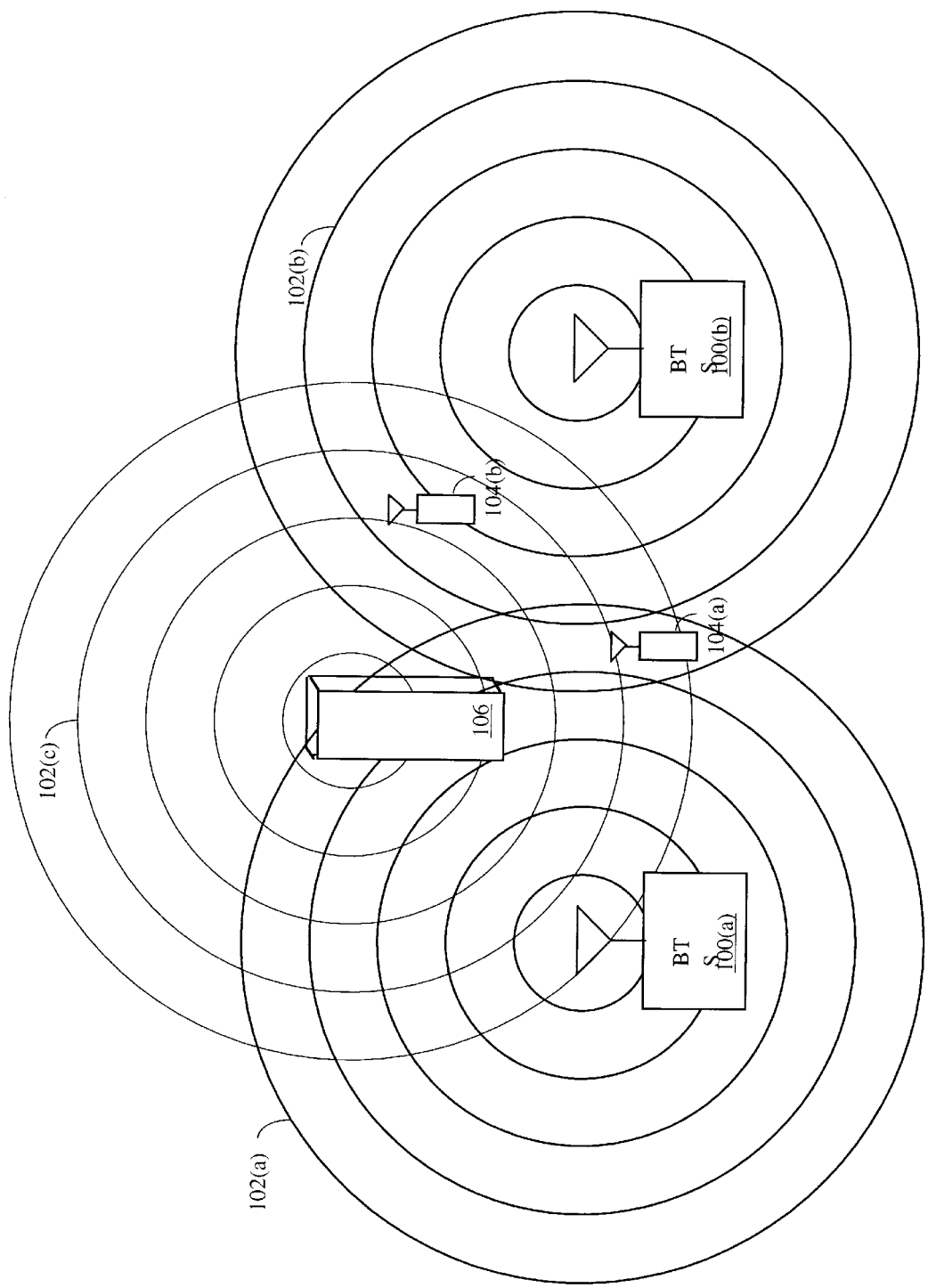
FIG. 1 is a diagram illustrating a radio frequency (RF) transmission associated with the forward link portion of a wireless telecommunication system.
Figure 2:
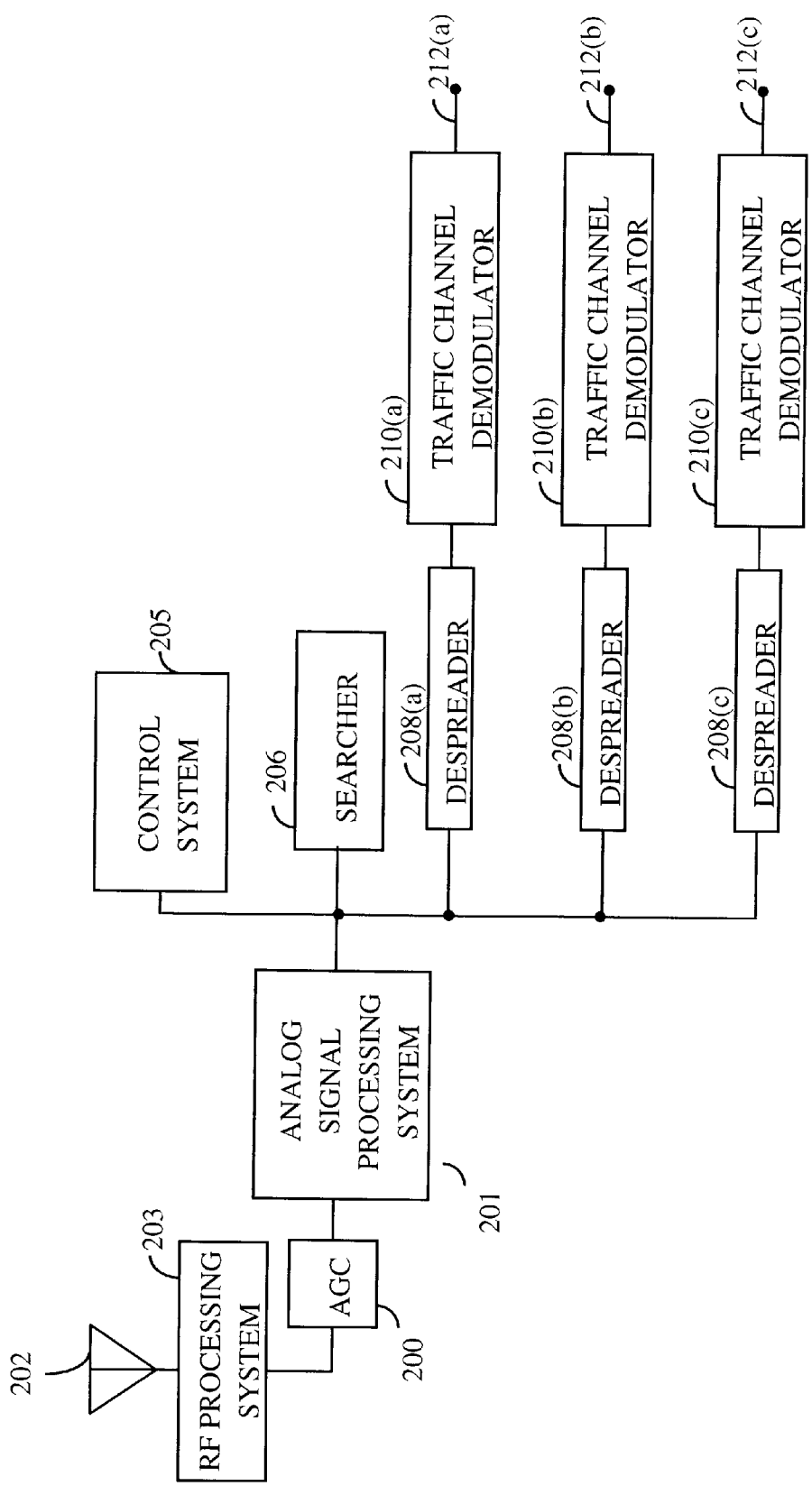
FIG. 2 is a block diagram of the RF signal reception and processing portion of a subscriber unit when configured in accordance with the prior art.

FHT systems 308(a)–(c) receive the despread data from despreaders 306(a)–(c) and perform a fast Hadamard transform on the despread data generated from despreaders 306(a)–(c). The fast Hadamard transform is essentially the matrix multiplication of the data with a Hadamard matrix using one of a set of fast algorithms for performing such an operation well known in the art. A normal matrix multiplication may also be performed, however, such an operation will not be as efficient as a fast Hadamard transform. The Hadamard matrix is comprised of the set of sixty-four channel codes used to modulate the various types of data and to define the various channels, and the result is the multiplication of each channel code by the despread data, and the summation of all the products resulting from the multiplications associated with a particular channel code. The fast Hadamard transform yields a set of values that represent the estimated signal or voltage levels transmitted via the corresponding set of channel codes used to generate the associated forward link signal 102 (FIG. 1). Each voltage level provides an estimate of the data transmitted over the corresponding channel, as well as the energy level of the associated forward link signal 102.

S & E systems 309(a)–(c) receive the set of estimates and calculate a corresponding ideal waveform for each channel. The shape of each wave corresponds to the estimated data value direct sequence modulated by the corresponding channel code. Various methods for performing the ideal waveform generation operation will be apparent to one skilled in the art including the application of the set of estimated data to another FHT system 308, or the use of a look-up table which stores the set of waveforms available for each channel, and which selects the appropriate one of those waveforms for each channel based on the corresponding data estimate. These waveforms are then adjusted based on the energy levels of the associated forward link signal, an estimate of which is also generated by FHT systems 308 as described above and summed together. S & E systems 309 then apply the resulting summed waveform value to the subtraction systems 312 associated with the other forward link signals 102 being processed.

Each subtraction system 312(a)–(c) subtracts the summed waveforms supplied by the S & E systems 309 from the signals from the corresponding delay circuits 311(a)–(c). Delay circuits 311 provide sufficient delay to allow FHT systems 308 and S & E systems to perform their various functions, and can be comprised of any type of data storage or memory system. The delay allows the waveforms calculated by S & E systems 309 to be subtracted from the appropriate portion of the forward link signal 102 being processed. The resulting signals from subtraction systems 312(a)–(c) are provided to traffic channel demodulator 311(a)–(c), which isolate a traffic channel by performing a direct sequence demodulation of the signals from subtraction systems 312(a)–(c) using the traffic channel code provided by control system 305. In the preferred embodiment of the invention this demodulation constitutes multiplication of the signals from delay circuits 311 with each chip from the traffic channel code, and summing the results of those multiplications to generate an voltage value that provides an estimate of the data being transmitted. As mentioned above, a traffic channel carries digital audio or digital data, or both associated with a particular communication, or telephone call.

The result of the demodulation by a traffic channel demodulator 310 is a signal that provides an indication of the data being transmitted via that traffic channel which is passed to combiner system 314. Combiner system 314 combines the signals from the set of traffic channel demodulator 310 to produce a more accurate estimation of the data being transmitted. This more accessible estimate can then be processed by other signal processing systems within subscriber unit 104 (FIG. 1). It should be noted that the estimates of the data provided by FHT systems 308 will have a significant probability of error, in some cases approaching ten percent (10%). The errors are ordinarily corrected later via the process of error detection and correction encoding. This error rate, however, will generally be low enough that substantial benefit will still be provided by subtracting the signal level that is calculated based on those estimates.

The above described method of transferring audio information and data via the forward link portion of a wireless telecommunication system communication provides improved efficiency and performance, and an increased likelihood of accurate reception. This is because more of the unnecessary signaling is removed before an estimate of the data is made when compared to the prior system. The digitized signal received by a particular traffic channel demodulator 310 is comprised of the forward link signal 102 being demodulated, other forward link signals 102, and background noise and other types of interference. By performing a fast Hadamard transform on the other forward link signals 102, the signal levels associated with those forward link signals 102 can be determined and removed using subtraction circuits 312. Energy from the remaining signal is comprised of the desired forward link signal 102 as well as background noise and interference. Thus, a greater portion of the energy of the signals from subtraction circuits 312 will be due to the desired forward link signal 102, and therefore the data associated with that desired forward link signal 102 may more easily be determined by traffic channel demodulators 310.

The above described signal processing scheme is especially useful during the processing of the forward link portion of a wireless telecommunications system because tracking a single forward link signal 102 allows the energy associated with the each of the multiple channels carried by that forward link signal 102 to be removed. This is significantly simpler than tracking multiple signals each associated with one type of information or communication carried by the channels, which is the case for data transmission via the reverse link from a subscriber unit 104 to a base transceiver station 100. Additionally, the number of forward link signals 102 generated either via reflection or by multiple base transceiver stations 100 (FIG. 1) is much smaller than the number of reverse link signals generated by the set of subscriber units located within a given cell area, and therefore the portion of the energy that can be removed via such signal processing is much greater than on the reverse link, allowing a proportionality greater benefit to be achieved for a given amount of signal processing resources.

In an alternative embodiment of the invention, FHT systems 308 are substituted with channel demodulation systems similar to traffic channel demodulators 310, except that the new channel demodulation systems will use a channel code associated with the pilot channel to demodulate the forward link signal 102. In some CDMA wireless telecommunications systems, the pilot channel contributes over twenty percent (20%) of the power associated with a given forward link signal 102, which is done in order to facilitate detection of the forward link signal using that pilot channel. By demodulating with the pilot channel code, the energy level associated with the pilot channel is determined, and this energy level can then be subtracted from the signals from delay circuits 311 in accordance with the subtraction of the energy levels detected by FHT systems 308 as described above.

While subtracting the energy levels associated with the pilot channel alone does not provide as much benefit as subtracting the energy level associated with an entire forward link signal 102, the signal processing resources necessary to demodulate with a single channel code are substantially less than that necessary to perform a fast Hadamard transform. Since the pilot channel is responsible for a substantial portion of the total energy, much of the benefit of the above described system can be derived via the use of pilot channel demodulation system with a substantial reduction in the required signal processing resources relative to the use of FHT systems 308. Additionally, in the preferred embodiment of the invention the channel code associated with the pilot signal is the Walsh code containing all zeros, and the data being transmitted via the pilot channel is also all zeros, thus making the demodulation and estimation of data for the pilot channel much more simple than that necessary for any other channel. This second embodiment of the invention is even more suited to use in the forward link portion of a wireless telecommunications systems because a pilot signal is generally not utilized during the reverse link portion of many CDMA wireless telecommunications system communications.

In other alternative embodiments of the invention, other well known systems for measuring the energy level associated with a forward link signal may be substituted for FHT systems 308. Additionally, other systems that estimate the energy associated with a channel other than the pilot channel, or that estimate the energy associated with a sub-set of all the available channels, are also contemplated.

Thus, an improved method and apparatus for processing the forward link portion of a wireless telecommunications system communication is described. The description of the preferred embodiment is provided to enable any person skilled in the art to make or use the present invention. Various modifications of the invention will be readily apparent to one skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a wireless telecommunication system in which a receiver receives a first composite signal comprising a target CDMA signal and at least one interfering CDMA signal, each CDMA signal consisting of a set of synchronized, orthogonal sub-channels, each set including a pilot sub-channel which allows synchronized demodulation of the other non-pilot sub-channels within its parent CDMA signal, a method of processing the first composite signal comprising the steps of:

(a) receiving the first composite signal;

(b) using the pilot sub-channel within the at least one interfering CDMA signal to perform a first synchronized demodulation of the non-pilot sub-channels within the interfering CDMA signal to form estimates of the transmitted values and estimates of received signal strengths for each sub-channel of the at least one interfering CDMA signal;

(c) creating a first reconstructed version of the at least one interfering CDMA signal by performing ideal waveform generation using said estimates of the transmitted values and said estimates of received signal strengths;

(d) performing a delay on the first composite signal to create a delayed composite signal which is synchronized in time with said first reconstructed version of the at least one interfering CDMA signal;

(e) subtracting from said delayed composite signal said first reconstructed version of the at least one interfering CDMA signal, to produce a second composite CDMA signal;

(f) demodulating a non-pilot sub-channel of the target CDMA signal using said second composite CDMA signal as input.

2. The method of claim 1 wherein a searcher is used to track the pilot sub-channel of one or more of the CDMA signals.

3. The method of claim 1 wherein one of said first synchronized demodulation and said ideal waveform generation is performed using a Fast Hadamard Transform (FHT).

4. The method of claim 1 in which at least one of the interfering CDMA signals contains data identical to that in the target CDMA signal.

5. The method of claim 1 wherein said delay performed on the first composite signal is approximately one fourth of a Walsh code in length.

6. The method of claim 1 wherein said delay performed on the first composite signal is approximately one eighth of a Walsh code in length.

7. A receiver in a wireless telecommunication system in which the received signal comprises a target CDMA signal and at least one interfering CDMA signal, each CDMA signal consisting of a set of synchronized, orthogonal sub-channels, each set including a pilot sub-channel which allows synchronized demodulation of the other non-pilot sub-channels within its parent CDMA signal; said receiver comprising:

(a) an analog signal processing system which downconverts the received signal to create a downconverted signal;

(b) a first despreader, operably connected to said analog signal processing system, which despreads said downconverted signal according to time offset information associated with the target CDMA signal, to create a first despread version of said first downconverted signal;

(c) a second despreader, operably connected to said analog signal processing system, which despreads said downconverted signal according to time offset information associated with one of the at least one interfering CDMA signal, to create a second despread version of said first composite signal;

(d) a channel demodulation system, operably connected to said second despreader, which uses pilot timing information for the interfering CDMA signal to perform a first synchronized demodulation of the orthogonal sub-channels within the interfering CDMA signal, said synchronized demodulation producing estimates of transmitted values and received signal strengths of data for the orthogonal sub-channels of the interfering CDMA signal;

(e) a summation and estimation system, operably connected to said channel demodulation system, which performs ideal waveform generation according to said estimates of transmitted values and received signal strengths to create a first reconstruction of the interfering CDMA signal;

(f) a delay system, operably connected to said first despreader, which performs a delay of said downconverted signal to create a delayed composite signal;

(g) a subtraction system, operably connected to said delay system and said summation and estimation system, which subtracts from said delayed composite signal said first reconstruction, to create a second composite signal; and (h) a traffic channel demodulator, operably connected to said subtraction system, which demodulates of said second composite signal to extract one or more sub-channels of the target CDMA signal.

8. The receiver of claim 7 further comprising a searcher for detecting and tracking pilot channel signals at different time offsets, operably connected to said analog signal processing system and said despreaders.

9. The receiver of claim 7 wherein one of said first synchronized demodulation and said ideal waveform generation, operate utilizing a Fast Hadamard Transform (FHT).

10. The receiver of claim 7 further comprising additional sets of elements, each set comprising a despreader, a channel demodulation system, and a summation and estimation system; and each set producing an ideal waveform reconstruction of an additional interfering CDMA signal which is also subtracted from said delayed composite signal by said subtraction system.

11. The receiver of claim 7 wherein at least one of the interfering CDMA signals contains data identical to that in the target CDMA signal.

12. The receiver of claim 7 wherein said delay system causes a delay of approximately one fourth of one Walsh code.

13. The receiver of claim 7 wherein said delay system causes a delay of approximately one eighth of one Walsh code.

* * * * *